Patented June 3, 1952

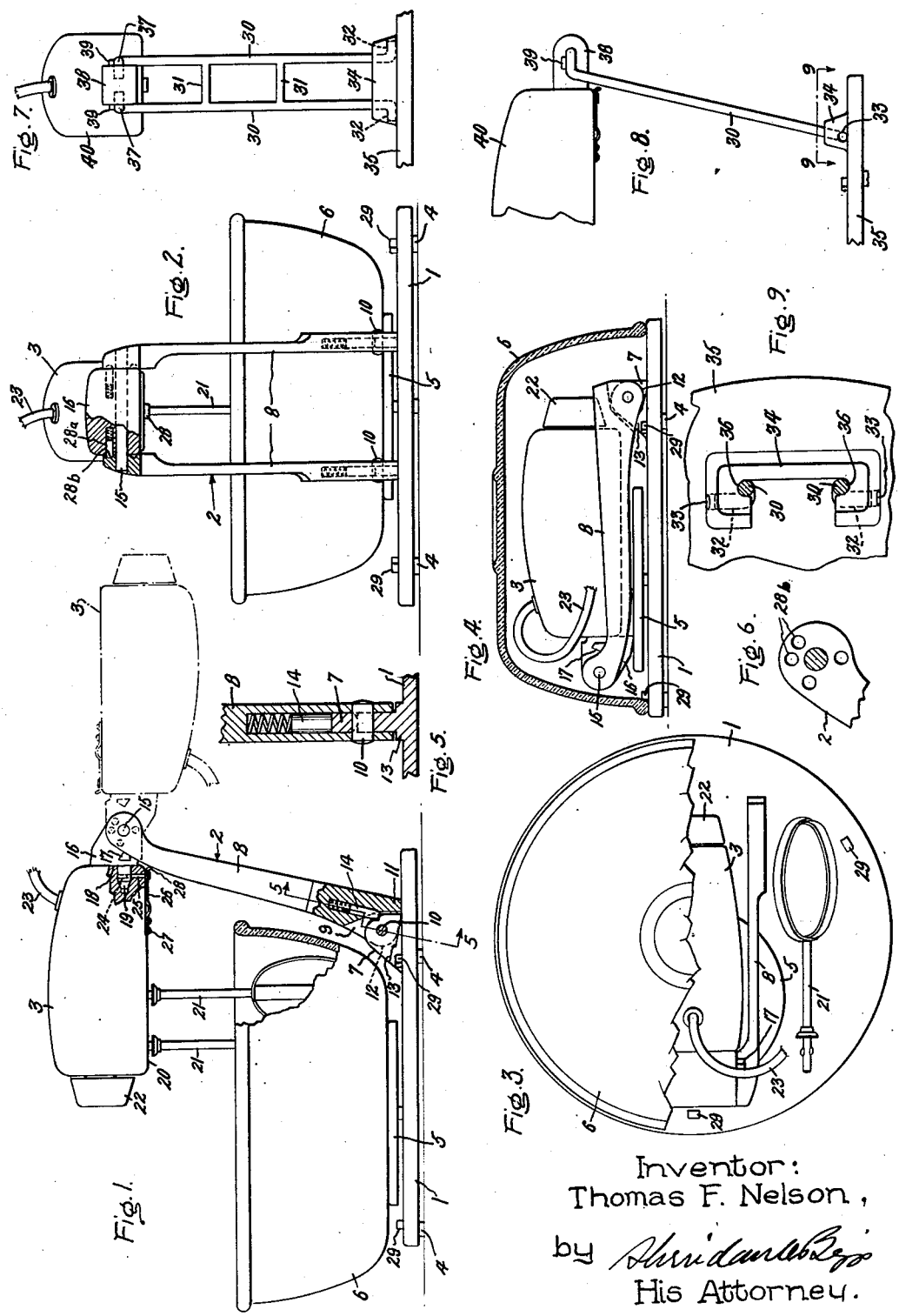

2,599,275

UNITED STATES PATENT OFFICE 2,599,275

FOLDING ELECTRIC FOOD MIXER

Thomas F. Nelson, Stratford, Conn., assignor to General Electric Company, a corporation of New York Application September 13, 1951, Serial No. 246,419

2 Claims. (Cl. 259—104)

The present invention relates to electric food mixers of the household or domestic type and has for its object to provide an improved construction and arrangement whereby the food mixer may be folded in a compact manner for storing.

According to my invention, I so construct and arrange the food mixer that the standard and power unit may be folded down on top of the base and be positioned preferably within the confines of the base whereby the standard and power unit may be covered by a suitable cover resting on the base.

For a consideration of what I believe to be novel and my invention, attention is directed to the following specification and to the claims appended thereto.

In the drawing, Fig. 1 is a side view partly in section of a food mixer embodying my invention; Fig. 2 is an end view, partly in section; Fig. 3 is a plan view showing the mixer folded and provided with a cover, the cover being partly broken away; Fig. 4 is a side view of the mixer folded, the cover being in section; Fig. 5 is a detail sectional view taken on line 5—5, Fig. 1; Fig. 6 is a detail view of the upper end of the mixer standard; Fig. 7 is an end view of a modification; Fig. 8 is a side view of the structure shown in Fig. 7; and Fig. 9 is a sectional view taken on line 9—9, Fig. 8.

Referring to Figs. 1 to 4, 1 indicates the base of the food mixer, 2 the standard and 3 the power unit. Base 1 is circular and is provided with suitable supporting feet 4 and a bowl supporting pan 5 on which in Figs. 1 and 2 a mixing bowl 6 is shown. At the rear of base 1 is a pair of spaced apart upwardly projecting pivot ears 7 spaced inwardly from the edge of the base. Standard 2 comprises two spaced legs 8 which at their lower ends are provided with recesses 9 in which ears 7 are positioned, the lower ends of the legs being pivotally connected to the ears by pivot pins 10. The lower ends of legs 8 are shaped to provide feet 11 having flat bottoms which rest on base 1 and serve to hold standard 2 in upright position as shown in Figs. 1 and 2. The forward lower ends of legs 8 are rounded as indicated at 12, being shaped to permit standard 2 to be moved from its upright position as shown in Figs. 1 and 2 to its folded position as shown in Figs. 3 and 4 where it is positioned directly over and substantially parallel to base 1. It is supported in such position by suitable stops 13 at the sides of ears 7 against which the forward sides of legs 8 rest as shown in Fig. 4. When in upright position, it is held from accidental forward movement by suitable detent or catch means comprising spring pressed pins 14 having rounded ends which frictionally engage rounded notches in ears 7.

Pivotally mounted between the upper ends of legs 8 on a pivot pin 15 is a head 16 having stops 17 on opposite sides which engage the forward edges of legs 8 when head 16 is in the Figs. 1 and 2 position to limit the forward turning movement of the head on the pivot pin. The outer end of head 16 has a flat surface 18 from which projects a swivel stud 19. The power unit 3 is swivelled on stud 19 as shown in Fig. 1, its end being provided with a flat surface which takes against surface 18 on head 16 and with an opening in which the swivel stud is located. The power unit may be of any suitable construction, the power take off face 20 from which the beaters 21 project being provided with suitable openings to receive the beater shafts to permit of their connection with the gearing of the power unit through which the beaters are driven by the electric motor, all in a known and understood manner. The operating knob for the motor is indicated at 22 and the electric cord at 23.

It is desirable that the power unit be readily removable from the swivel stud and that the arrangement be such that it may be locked on the swivel stud in the position shown in Fig. 1 in which the power take off face 20 faces downward or in a position wherein it is turned 180° from the position shown in Fig. 1 in which position the power take off face 20 faces upward.

In the present instance I have shown a simple arrangement for accomplishing this result wherein the swivel stud 19 is provided with an opening 24 extending through it adapted to receive the inner end of a locking pin 25 which is carried by and biased to locking position by a flat leaf spring 26 which is fastened to face 20 at one end as shown at 27 and to the locking pin at its other end. At its free end spring 26 is curved downwardly to provide a finger piece 28 which may be pressed to remove the end of pin 25 from opening 24.

In connection with head 16 there is provided detent or catch means for frictionally holding the power unit in its several adjusted positions comprising spring pressed pins 28$^a$ in head 16 having rounded ends which engage in rounded recesses 28$^b$ in the adjacent faces of legs 8. In the present instance recesses 28$^b$ are shown corresponding to the full line position of the power unit as shown in Fig. 1, to a position in which the power unit is tilted upward at an angle of approximately 45° to the horizontal, to the dotted line position in Fig. 1, and to the folded position in Figs. 3 and 4.

In Figs. 1 and 2 the mixer is shown in normal position for using. To fold it for storing, power unit 3 may be turned on pivot pin 15 to the dotted line position in Fig. 1, for example, the beaters 21 detached from the unit and the unit then swivelled on stud 19 through 180° and locked in such position so that in the dotted line position take off face 20 faces downward. Then the mixing bowl 6 may be removed from pan 5, standard 2 folded down over the base and power unit 3 folded down to the position shown in Figs. 3 and 4 where it is positioned between legs 8. In this position it is supported by stops 17, the reverse faces of which rest on top surfaces of legs 8. The cord 23 then may be coiled around the power unit or otherwise folded, the beaters 21 positioned on base 1 at the sides of the power unit after which a suitable cover such as bowl 6 may be placed over the standard and power units, its edges resting on the rim of the base as shown in Fig. 4. Spaced lugs 29 may be provided on base 1 for positioning and holding the cover on the base.

It will be noted that pivot ears 7 are spaced well in from the edge of base 1 and that the standard 2 is of a length less than the diameter of base 1 so that when folded down on the base, the standard and power unit are well within the confines of the base so that a cover may be positioned over them and supported on the base.

In Figs. 7 to 9 is shown a form of my invention wherein the standard is in the form of a wire frame comprising vertical wires 30 braced by cross wires 31, the wires being suitably united by means such as brazing or welding. At their lower ends, wires 30 are provided with offset outwardly turned pivot ends 32 positioned in pivot openings 33 in a U-shaped upwardly projecting boss 34 on the base 35, the facing edges of the arms of the boss being provided with substantially vertical grooves 36 in which the wires 30 adjacent their lower ends are located to lock the standard in vertical position. At their upper ends, wires 30 are provided with offset inwardly facing pivot ends 37 positioned in openings in a head 38, corresponding to head 16 of Figs. 1 to 4. The head is provided with stop lugs 39 which engage the top portions of the offsets at the upper ends of wires 30 to hold power unit 40 in its normal operating position as shown clearly in Fig. 6. Otherwise, the structure of Figs. 5 to 7 may be similar to that of Figs. 1 to 4. When the mixer is to be folded for storage, the procedure may be the same as that described in connection with Figs. 1 to 4, except that to fold the standard down over the base, it is necessary to squeeze together the wires 30 at their lower ends to release them from grooves 36.

What I claim as new and desire to secure by Letters Patent of the United States is:

1. In an electric food mixer, the combination of a base, a standard comprising a pair of spaced legs pivoted at their lower ends on the base at points spaced inward from the edge of the base, a head pivoted on the upper ends of said legs to swing in a plane at right angles to the base, a power unit swivelled on said head to turn on its longitudinal axis, cooperating means between the lower end of said legs and the base for holding the standard in a substantially vertical position, and cooperating means between said head and said legs for holding the power unit in a substantially horizontal position over the base, said head being adapted to be turned on its pivot to bring the power unit to a position substantially parallel to said legs, and said legs being adapted to be turned on their pivots with the base to fold the legs and power unit down onto the base, said legs being of a length less than the distance from their hinge point on the base to the far edge of the base.

2. In an electric food mixer, the combination of a base, a standard comprising a pair of spaced legs pivoted at their lower ends on the base at points spaced inward from the edge of the base, a head pivoted on the upper ends of said legs to swing in a plane at right angles to the base, a power unit carried by said head, said legs being spaced apart a distance greater than the width of the power unit, cooperating means between the lower end of said legs and the base for holding the standard in a substantially vertical position, and cooperating means between said head and said legs for holding the power unit in a substantially horizontal position over the base, said head being adapted to be turned on its pivot to bring the power unit to a position between and substantially parallel to said legs, and said legs being adapted to be turned on their pivots with the base to fold the legs and power unit down onto the base, said legs being of a length less than the distance from their hinge point on the base to the far edge of the base.

THOMAS F. NELSON.

REFERENCES CITED

The following references are of record in the file of this patent:

UNITED STATES PATENTS

| Number | Name | Date |
|---|---|---|
| 1,911,202 | Nielsen | May 30, 1933 |
| 1,918,186 | Juengst et al. | July 11, 1933 |
| 2,061,868 | Fitzgerald | Nov. 24, 1936 |
| 2,086,817 | Newnham | July 13, 1937 |
| 2,462,089 | Frisbie | Feb. 22, 1949 |